United States Patent
Tsirkin et al.

(10) Patent No.: US 10,838,752 B2
(45) Date of Patent: Nov. 17, 2020

(54) NETWORK NOTIFICATION LOSS DETECTION FOR VIRTUAL MACHINE MIGRATION

(71) Applicant: Red Hat Israel, Ltd., Raanana (IL)

(72) Inventors: Michael Tsirkin, Lexington, MA (US); Amnon Ilan, Katzir (IL)

(73) Assignee: Red Hat Israel, Ltd., Raanana (IL)

( * ) Notice: Subject to any disclaimer, the term of this patent is extended or adjusted under 35 U.S.C. 154(b) by 134 days.

(21) Appl. No.: 15/688,791

(22) Filed: Aug. 28, 2017

(65) Prior Publication Data
US 2019/0065229 A1 Feb. 28, 2019

(51) Int. Cl.
*G06F 9/455* (2018.01)
*H04L 12/26* (2006.01)
*H04L 12/24* (2006.01)

(52) U.S. Cl.
CPC ...... *G06F 9/45558* (2013.01); *H04L 41/0672* (2013.01); *H04L 41/082* (2013.01); *H04L 41/0836* (2013.01); *H04L 43/0805* (2013.01); *H04L 43/0811* (2013.01); *H04L 43/0817* (2013.01); *G06F 2009/4557* (2013.01);
(Continued)

(58) Field of Classification Search
CPC .................................................. G06F 9/45558
See application file for complete search history.

(56) References Cited

U.S. PATENT DOCUMENTS 7,013,482 B1 * 3/2006 Krumel ............... H04L 63/0227
709/229
7,492,787 B2 2/2009 Ji et al.
(Continued)

FOREIGN PATENT DOCUMENTS

CN 103299278 A 9/2013
CN 105208048 12/2015
(Continued)

OTHER PUBLICATIONS

Youval Nachum et al. Feb. 24, 2013. "Scaling the Address Resolution Protocol for Large Data Center (SARP)". https://tools.ietf.org/id/draft-nachum-sarp-04.txt. Retrieved on May 2, 2017. 6 pages.
(Continued)

*Primary Examiner* — Hang Pan
(74) *Attorney, Agent, or Firm* — Lowenstein Sandler LLP

(57) ABSTRACT

A method includes receiving, by a processing device of a monitoring node, an indication over a network that a virtual machine successfully migrated from a first host to a second host. The indication includes a virtual machine address of the virtual machine executing on the second host. The method also includes, responsive to the indication that the virtual machine successfully migrated from the first host to the second host, starting to monitor incoming packets of the monitoring node for an incoming packet that includes a source address field having the virtual machine address, and, upon determining, after a threshold period of time, that none of the incoming packets include the source address field having the virtual machine address, notifying a reporting node that the incoming packet was not received to facilitate performance of an action to reduce downtime of communication with the virtual machine over the network.

20 Claims, 6 Drawing Sheets

(52) U.S. Cl.
CPC .............. *G06F 2009/45575* (2013.01); *G06F 2009/45591* (2013.01); *G06F 2009/45595* (2013.01); *H04L 41/046* (2013.01); *H04L 41/0816* (2013.01)

(56) References Cited

U.S. PATENT DOCUMENTS

| | | | |
|---|---|---|---|
| 7,761,573 | B2 | 7/2010 | Travostino et al. |
| 8,396,986 | B2 | 3/2013 | Kanada et al. |
| 8,413,147 | B2 | 4/2013 | Shen et al. |
| 8,429,647 | B2 | 4/2013 | Zhou et al. |
| 8,539,045 | B2 | 9/2013 | Kang et al. |
| 8,819,678 | B2 | 8/2014 | Tsirkin |
| 8,850,430 | B2 | 9/2014 | Hayward et al. |
| 8,924,560 | B2 | 12/2014 | Pang et al. |
| 8,966,495 | B2 | 2/2015 | Kulkarni |
| 9,008,084 | B2 | 4/2015 | Zhang et al. |
| 9,081,603 | B2 | 7/2015 | Zhang et al. |
| 9,104,460 | B2 | 8/2015 | Jansen |
| 9,160,668 | B2 | 10/2015 | Tripathi et al. |
| 9,229,755 | B2 | 1/2016 | Dow et al. |
| 9,336,042 | B1 | 5/2016 | Brenneman et al. |
| 9,350,614 | B2 | 5/2016 | Zeng et al. |
| 9,396,022 | B2 | 7/2016 | Miyazaki |
| 9,424,144 | B2 | 8/2016 | Sridharan et al. |
| 9,565,126 | B2 | 2/2017 | Narayanasamy et al. |
| 9,628,290 | B2 | 4/2017 | Banavalikar et al. |
| 9,836,327 | B1 | 12/2017 | Brouwer et al. |
| 2008/0222375 | A1 | 9/2008 | Kotsovinos et al. |
| 2009/0183173 | A1 | 7/2009 | Becker et al. |
| 2011/0134931 | A1 | 6/2011 | Merwe et al. |
| 2013/0232492 | A1 | 9/2013 | Wang |
| 2013/0238802 | A1 | 9/2013 | Sarikaya |
| 2013/0262647 | A1 | 10/2013 | Kurita et al. |
| 2013/0275592 | A1 | 10/2013 | Xu et al. |
| 2013/0305242 | A1* | 11/2013 | Wang ................ G06F 9/45558 718/1 |
| 2014/0007089 | A1 | 1/2014 | Bosch et al. |
| 2014/0025821 | A1 | 1/2014 | Baphna et al. |
| 2014/0289399 | A1* | 9/2014 | Shimokuni ........... G06F 11/301 709/224 |
| 2014/0297889 | A1 | 10/2014 | Dong et al. |
| 2014/0298335 | A1* | 10/2014 | Regev ................ G06F 9/30076 718/1 |
| 2015/0029856 | A1* | 1/2015 | Rozenberg ............. H04L 69/40 370/235 |
| 2015/0117256 | A1 | 4/2015 | Sabaa et al. |
| 2015/0222515 | A1* | 8/2015 | Mimura ............. H04L 43/0876 709/224 |
| 2015/0309818 | A1 | 10/2015 | Lee et al. |
| 2015/0370596 | A1 | 12/2015 | Fahs et al. |
| 2015/0378759 | A1 | 12/2015 | Pershin et al. |
| 2016/0004548 | A1 | 1/2016 | Suzuki et al. |
| 2016/0070601 | A1 | 3/2016 | Yamamoto et al. |
| 2016/0077935 | A1 | 3/2016 | Zheng et al. |
| 2016/0103699 | A1* | 4/2016 | Thakkar ............. G06F 9/45558 718/1 |
| 2016/0117185 | A1 | 4/2016 | Fang et al. |
| 2016/0246632 | A1 | 8/2016 | Tsirkin |
| 2016/0323245 | A1 | 11/2016 | Shieh et al. |
| 2016/0378530 | A1 | 12/2016 | Ramasubramanian et al. |
| 2017/0005923 | A1 | 1/2017 | Babakian |
| 2017/0019328 | A1 | 1/2017 | Moreno et al. |
| 2017/0139742 | A1* | 5/2017 | Cropper ............. G06F 9/45558 |
| 2017/0264496 | A1 | 9/2017 | Ao et al. |
| 2017/0359414 | A1 | 12/2017 | Sengupta et al. |
| 2018/0091591 | A1 | 3/2018 | Puri et al. |

FOREIGN PATENT DOCUMENTS

| | | |
|---|---|---|
| EP | 2698957 B1 | 7/2016 |
| WO | WO2012051884 | 4/2012 |
| WO | WO2012119390 | 9/2012 |
| WO | 2017210641 A1 | 12/2017 |

OTHER PUBLICATIONS

Rickard Nobel. Jul. 14, 2012. "The vSwitch Notify Switches" Setting. http://rickardnobel.se/vswitch-notify-switches-setting/. Retrieved on May 2, 2017. 15 pages.

Gigamon, "Network Monitoring for Virtual Server Environments", Solution Brief, https://www.gigamon.com/sites/default/files/resources/solutions/sb-network-monitoring-for-virtual-server-environments-3115.pdf, 2014, 2 pages.

Vae, Karim, "Azure: How to Prepare for Maintenance Impacting your Virtual Machines", The insights of a Quirky Cloud Solution Architect on his Journey Through the Fast Paced IT Landscape, http://kvaes.wordpress.com/2017/02/13/azure-how-to-prepare-for-maintenance-impacting-your-virtual-machines/, Feb. 13, 2017, 6 pages.

Microsoft Corporation, "Simplify Virtual Machine Management and Migration with Ethernet Fabrics in the Datacenter", http://www.brocade.com/content/dam/common/documents/content-types/whitepaper/brocade-ms-ethernet-fabric-solution-blueprint.pdf, Mar. 2011, 20 pages.

Li et al., "HyperMIP: Hypervisor Controlled Mobile IP for Virtual Machine Live Migration Across Networks", School of Computer Science and Engineering, Beihang University, Beijing, China, accessed, Jun. 28, 2017, 9 pages, https://pdfs.semanticscholar.gor/661e/4e7dcde6197740184466a16daf7397238184.pdf.

"A Virtual Machine Loses Network Connectivity after vMotion (1007464)", VMWare Knowledge Base, Nov. 29, 2016, 2 pages, https://kb.vmware.com/selfservice/microsites/search.do?language=en_US&cmd=displayKC&externalId=1007464.

Wang et al., "Virtual Routers on the Move: Live Router Migration as a Network-Management Primitive", Princeton University, Princeton, NJ, USA; AT&T Labs—Research, Florham Park, NJ, USA, Aug. 17-22, 2008, 12 pages, http://www.cs.princeton.edu/courses/archive/fall10/cos561/papers/VROOM08.pdf.

Cully et al., "Remus: High Availability via Asynchronous Virtual Machine Replication", Department of Computer Science the University of British Columbia, accessed Jun. 27, 2017, 21 pages, http://www.usenix.org/legacy/event/nsdi08/tech/full_papers/cully/cully_html/.

Stuart, Morgan, "Mitigating Interference during Virtual Machine Live Migration through Storage Offloading", retrived from http://scholarscompass.vcu.edu/cgi/viewcontent.cgi?referer=https://www.google.co.in/&httpsredir=1&article=5724&context=etd, Virginia Commonwealth University, Richmond, Virginia, USA, Dec. 2016, 71 pages.

Shen, Z, et al., "Follow the Sun through the Clouds: Application Migration for Geographically Shifting Workloads", retrived from https://pdfs.semanticscholar.org/e76e/6d0753a4136337f1d10d94257825bd7a1cfd.pdf, Cornell University, In SoCC. ACM, Oct. 5-7, 2016, 14 pages.

Vmware, "More a Virtual Machine to a New Locationor Host", Jul. 28, 2017, 1 page.

Silvera et al,, "IP Mobility to Support Live Migration of Virtrual Machines Across Subnets", SYSTRO May 4-6, 2009, 10 pages.

Kalim et al., "Seamless Migration of Virtual Machines Across Networks", IEEE, 2013, 7 pages.

Bifulco, et al., "Transparent Migration of Virtual Infrastructures in Large Datacenters for Cloud Computing", IEEE, 2011, pp. 179-184.

* cited by examiner

NETWORK NOTIFICATION LOSS DETECTION FOR VIRTUAL MACHINE MIGRATION

TECHNICAL FIELD

The present disclosure is generally related to virtualization, and is more specifically related to network notification loss detection and resolution for virtual machine migration.

BACKGROUND

Data centers may include clusters consisting of multiple hosts (e.g., physical servers) in racks. Hypervisors may operate on each host to create and run virtual machines (VMs). VMs emulate computer systems and may be referred to as guest machines. The hosts in the clusters may be connected via one or more wired (e.g., Ethernet) and/or wireless (e.g., WiFi) networks (e.g., the Internet, local area network). In some instances, a VM on a source host may be migrated to a destination host. To communicate with the VM on the destination host, various components of the networks may be updated.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
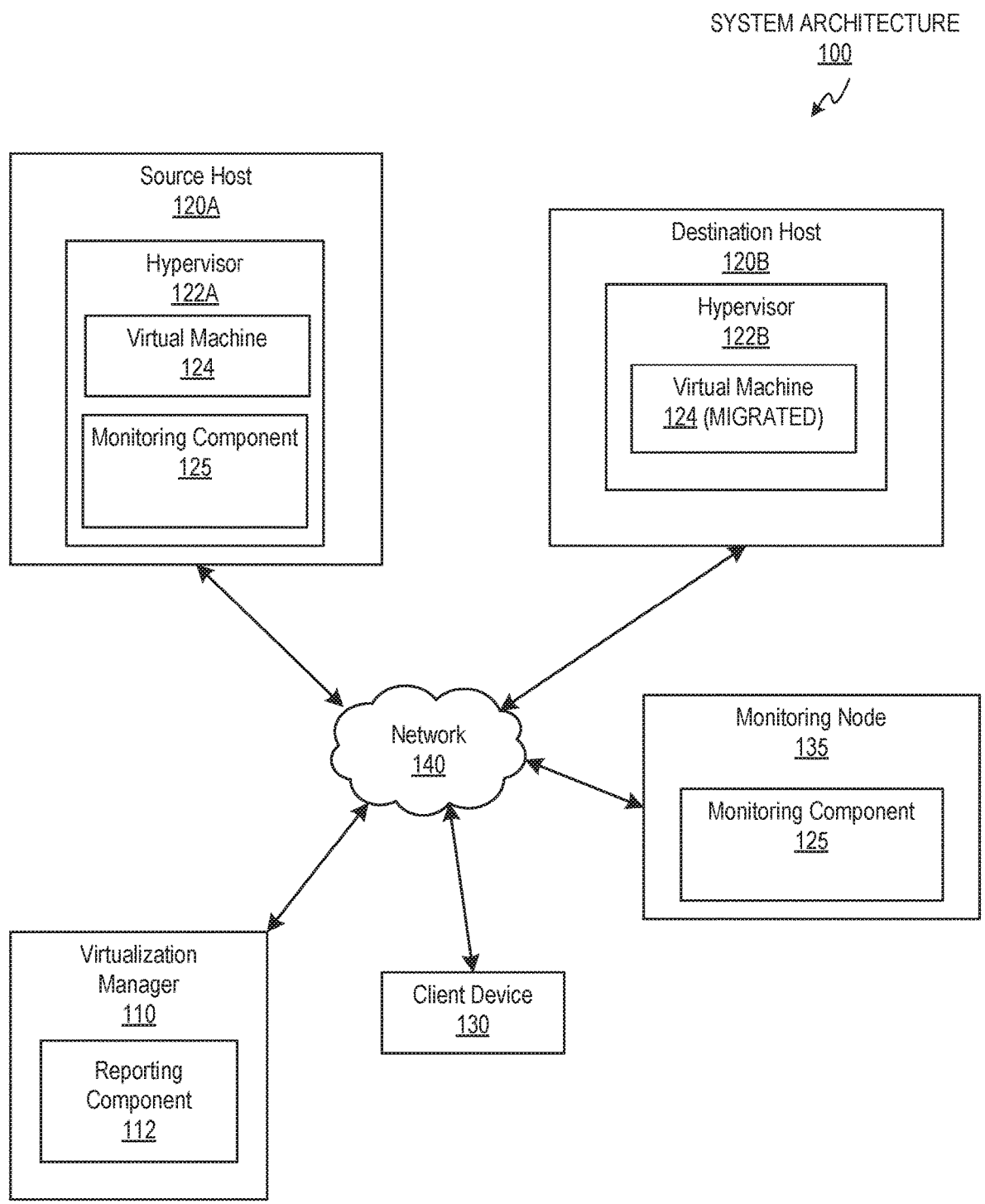
FIG. 1 depicts a high-level diagram of an example system architecture operating in accordance with one or more aspects of the present disclosure.

A virtual machine may execute via a source hypervisor on a source host in a managed virtualization environment. The virtual machine may be associated with a first address (e.g., a media access control (MAC) address tagged with a virtual local area network (VLAN) address) that corresponds to the source host. The source host may be connected to other hosts via a network. As the virtual machine or the hypervisor sends packets from the source host across the network to other hosts, components (e.g., switches) of the network may inspect the packets and determine that the first address of the virtual machine is coming from a port associated with the source host. This information may be added to a forwarding table maintained by each of the components of the network. As such, when the components receive packets from other hosts that include a destination address set to the address of the virtual machine, the components may forward the packets using the port to the source host.

In some instances, a topology of the network may change, for example, when a virtual machine executing on the source host is migrated to a destination host. The network previously observed that packets from the virtual machine were being sent from the address and port, but the virtual machine may now be at a new location in the network and may send packets associated with a different port. Thus, packets from the virtual machine may arrive from a different direction on the different port (e.g., incoming port) at components in the network. Accordingly, in some instances, the destination host may broadcast a notification packet (e.g., reverse address resolution protocol (RARP) packet) using the address of the virtual machine as the source address field in the packet. The notification packet may cause the components of the network to update their forwarding tables with the address and different port to enable packets to be sent from and forwarded to the virtual machine at its new location (e.g., on the destination host) in the network. However, the notification packets may get lost and cause network disruption for the virtual machine. For example, a hypervisor may be out of memory and discard the notification packet such that it is not transmitted to other components in the network. This disruption may be observed as bad performance, which may be hard to distinguish from other downtime sources and may be difficult to debug and recover from efficiently.

Aspects of the present disclosure address the above and other deficiencies by providing technology directed to network notification loss detection and resolution for virtual machine migration. In an implementation, a virtual machine may be migrated from a source host to a destination host, resulting in the packets from the virtual machine arriving at a different port on the components in the network. When the virtual machine starts successfully on the destination host, the destination host may broadcast a notification packet including a source address field with the address of the virtual machine. Also, when the virtual machine starts successfully on the destination host, an indication of successful migration to the destination host may be sent to the hypervisor on the source host, and as a result of the indication, the hypervisor on the source host may start monitoring the network for incoming packets having the address as the source address field. Thus, the source host may be referred to as a monitoring node. Further, one or more additional monitoring nodes may be installed within the network. The monitoring nodes may receive the indication of the successful virtual machine migration and begin monitoring for the incoming packets having the address as the source address field.

If the monitoring nodes receive the incoming packet within a threshold period of time, then the monitoring nodes may transmit a notification to a reporting node (e.g., virtualization manager application). Upon receiving the notification, the reporting node may determine that the network is up to date with the new location of the virtual machine, and the components have updated forwarding tables with the different ports at which packets from the migrated virtual machine arrive. If one or more of the monitoring nodes does not receive the incoming packet within the threshold period of time, then the one or more monitoring nodes may transmit a notification to the reporting node to enable performance of an action to reduce communication downtime with the virtual machine.

In another implementation, the reporting nodes may also receive the indication of successful virtual machine migration from the source host to the destination host. Thus, the reporting node may be made aware that it may be receiving a notification from the monitoring nodes that the monitoring nodes received an incoming packet having the virtual machine address as the source address field. When the reporting node receives the notification within a threshold period of time, the reporting node may determine that the network is updated. When the reporting node does not receive a notification from a monitoring node after the threshold period of time for a migration that the reporting node knows took place, the reporting node may perform the action to reduce communication downtime with the virtual machine.

The action may include, for example, logging the event (e.g., lost notification packet) as a cause of the downtime, notifying a host networking administrator, requesting the destination host resend the notification packet including the virtual machine address as the source address field, or the like. As such, the techniques disclosed herein may improve performance of the network by reducing communication downtime of a virtual machine after the virtual machine is migrated to a destination host. Downtime may be reduced by quickly detecting the notification packet has been lost and taking action to update the components in the network with the ports associated with packets sent from the virtual machine at the new location (e.g., destination host).

FIG. 1 illustrates an example system architecture 100 in which implementations of the disclosure may operate. The system architecture 100 may include a virtualization manager 110, a plurality of host systems 120A (hereinafter "source host 120A") and 120B (hereinafter "destination host 120B"), a client device 130, and one or more monitoring nodes 135 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

The source host 120A and the destination host 120B may comprise one or more processors communicatively coupled to memory devices and input/output (I/O) devices. The source host 120A and the destination host 120B may run a plurality of virtual machines by executing a hypervisor 122A and 122B, respectively, to abstract the physical layer, including processors, memory, and I/0 devices, and present this abstraction to the virtual machines as virtual devices. For example, as depicted, hypervisor 122A may run virtual machine 124. The virtual machine 124 may execute a guest operating system that may utilize the underlying virtual devices, including virtual processors, virtual memory, and virtual I/0 devices.

One or more applications may be running on a virtual machine under the guest operating system. The hypervisors 122A and 122B may create, run, manage, and monitor various aspects of virtual machines operation, including the processing, and storage, memory, and network interfaces. In an illustrative example, hypervisors 122A and 122B may communicate with the virtualization manager 110 using a Virtual Desktop and Server Management (VDSM) daemon (not shown). The VDSM daemon may include an application programming interface (API) with which the virtualization manager 110 interfaces.

The VDSM or any suitable application executing on the source host 120A and the destination host 120B may provide status notifications to the virtualization manager 110 that indicate the operating state of the hypervisors 122A and 122B and/or the virtual machines 124. In an example, the hypervisors 122A and 122B may be connected to each other via the network 140 and may send notifications back and forth without sending the notifications to the virtualization manager 110. The status notification may be transmitted by the VDSM or other application when the virtual machine 124 is successfully migrated to the destination host 120B and starts to execute on the destination host 120B via the hypervisor 122B. Additionally, the VDSM or any suitable application may provide a notification that indicates that the hypervisor 122B or the virtual machine 124 sent out a notification packet that includes the virtual machine address in a source address field over the network. Sending the notification packet may cause components (e.g., switches) to identify the address of the virtual machine and update their forwarding tables with the different incoming ports at which the packets from the virtual machine arrived. However, as noted above, the notification packet may not result in the network fully updating (e.g., when a notification packet is lost) and the techniques disclosed herein may be used to detect and resolve such broadcast issues.

In an example, the source host 120A may include a monitoring component 125 and may be referred to as a monitoring node. The monitoring component 125 may be implemented as computer instructions stored on one or more memories and executed by one or more processing devices of the source host 120A. In an example, the monitoring component 125 on the source host 120A may be part of the hypervisor 122A. In another example, the monitoring component 125 on the source host 120A may interface with the hypervisor 122A.

There may also be one or more additional monitoring nodes 135 that include the monitoring component 125 installed throughout the network 140. The monitoring nodes 135 may be various networking components (e.g., host systems in a cluster, switches, relays, etc.) in the network 140. The monitoring component 125 on the monitoring nodes 135 may also be computer instructions stored on one or more memories and executed by one or more processing devices of the monitoring nodes 135. The monitoring component 125 may be installed on each monitoring node 135 in the network 140 or on just a subset of the networking components in the network 140. For example, just the networking components that receive a high percentage (e.g., 50 percent, 75 percent, 85 percent, etc.) of packet traffic may include the installed monitoring components 125 and be monitoring nodes 135.

The monitoring component 125 may receive an indication from the virtualization manager 110 or the hypervisor 122B of the destination host 120B. The indication may indicate that the virtual machine 124 migrated successfully and started on the destination host 120B. The indication may also include the address of the virtual machine that is executing on the destination host 120B. In response to receiving the indication, the monitoring component 125 may begin to monitor the network 140 for incoming packets that have a source address field set to the address of the virtual machine. For example, the monitoring component 125 may monitor a network interface card (NIC) of the source host 120A for the received incoming packets.

Also, in an example, when the indication is received by a monitoring node 135 separate from the source host 120A, the indication may include an instruction to the monitoring component 125 to monitor for a specific type of incoming packets (e.g., a reverse address resolution protocol (RARP) packet type). This particular packet type may be used when a change is made to a topology of the network 140, and thus, may enhance robustness of detection at the monitoring nodes 135 by looking for packets that include the address of the virtual machine and have the packet type indicative of a change in the network 140. In other words, also inspecting for the packet type may help the monitoring nodes 135 not detect an older message sent by the virtual machine before the network change that resulted from migration.

Further, in another example, when the indication is received by the source host 120A, the indication may also include an instruction to shut down the virtual machine 124 executing on the source host 120A. Thus, when the indication that the virtual machine started successfully on the destination host 120B is received, the hypervisor 122A may shut down the virtual machine on the source host 120A.

Conventionally, the hypervisor 122A may exit or shut down after receiving the indication that the virtual machine migrated successfully (if there are no other virtual machines running on the source host 120A). However, in an example of the present disclosure, the hypervisor 122A may remain active after migration is complete to monitor for the incoming packet with the source address field set to the address of the virtual machine. If the incoming packet is received within a threshold period of time, the monitoring component 125 may transmit a notification to a reporting node. It should be understood that the virtualization manager 110 may be referred to as a reporting node herein. As such, in one example, the virtualization manager 110 may include a reporting component 112. In another example, the reporting component 112 may also be installed on the source host 120A. In such an example, the source host 120A that includes the reporting component 112 may also be referred to as a reporting node. When the reporting node receives the notification that the incoming packet is received, the reporting node may determine that the network 140 is updated with the ports at which the packets having the virtual machine address sent by the virtual machine 122B from the destination host 120B arrive.

In another example, if the incoming packet having the address of the virtual machine in the source address field is not received within a threshold period of time, the monitoring component 125 may transmit a notification to the reporting node to enable performance of one or more actions to reduce downtime of communicating with the virtual machine 124 on the destination host 120B. It should be appreciated that in examples where a node (e.g., source host 120A) includes both the monitoring component 125 and the reporting component 112, the node may perform detection of the broadcast issue and the one or more actions to attempt to resolve the broadcast issue.

In another example, the reporting node may also receive the indication that the virtual machine migrated successfully from the hypervisor 122B of the destination host 120B. As a result of the indication, the reporting node may be expecting the notification that the incoming packet having the address of the virtual machine in the source address field is received by the monitoring components 125 of the monitoring nodes. When the reporting node receives the notifications from the various monitoring components 125, the reporting node may determine that the network is updated. When the reporting node does not receive the notification within a threshold period of time from the monitoring components 125, the reporting node may determine that there is a packet broadcast issue and may perform one or more actions to reduce downtime of communicating with the virtual machine 124 on the destination host 120B. The one or more actions may include transmitting an instruction to the destination host 120B to restart the virtual machine 124 and/or restart the destination host 120B, logging the broadcast lost event as a cause of the downtime, request the destination host 120B to resend a notification packet having a source address field set to the address of the virtual machine, or the like.

The virtualization manager 110 may be hosted by a computer system and include one or more computer programs executed by the computer system for centralized management of the system architecture 100. In one implementation, the virtualization manager 110 may comprise various interfaces, including administrative interface, reporting interface, and/or application programming interface (API) to communicate with the client device 130, the source host 120A, and the destination host 120B of system architecture 100, as well as to user portals, directory servers, and various other components, which are omitted from FIG. 1 for clarity. The reporting component 112 of the virtualization manager 110 may be implemented as computer instructions stored on one or more tangible, non-transitory computer-readable media executed by one or more processing devices of the computer system hosting the virtualization manager 110.

Virtualization manager 110 may provide virtual machine migration management to migrate existing virtual machines from one host (e.g., source host 120A) to a second host (e.g., destination host 120B). In one example, an administrator may use the client device 130 (e.g., laptop, desktop, tablet, smartphone, server) to request migration of the virtual machine 124 to the destination host 120B. The migration may include copying various data structures (e.g., disks, volumes, etc.) associated with the virtual machine 124 from the source host 120A to the destination host 120B, starting the virtual machine 124 on the destination host 120B, and/or stopping the virtual machine 124 on the source host 120A. The reporting component 112 of the virtualization manager 110 may be used to perform one or more actions in response to the detected broadcast issue described above. The techniques disclosed herein may enable improving performance of the system 100 by detecting when a broadcast notification is lost for the virtual machine that is migrated, determining that is the reason for communication downtime with the virtual machine 124, and resolving the broadcast issue.

Figure 2:
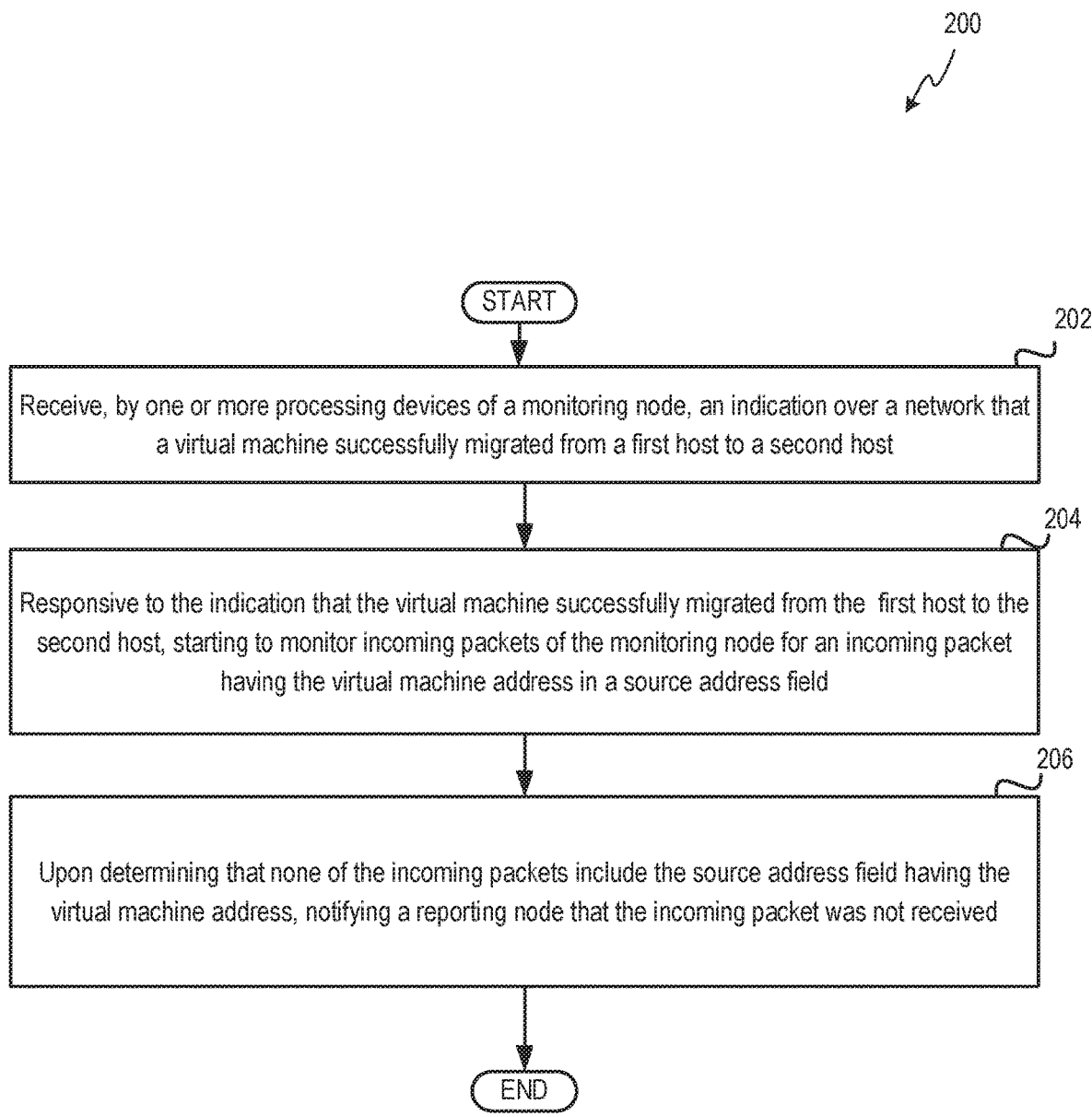
FIG. 2 depicts a flow diagram of an example method for detecting network notification loss for virtual machine migration, in accordance with one or more aspects of the present disclosure.

FIG. 2 depicts a flow diagram of an example method 200 for detecting network notification loss for virtual machine migration, in accordance with one or more aspects of the present disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by monitoring component 125 executed by one or more processing devices of the source host 120A and/or the monitoring node 135.

Method 200 may begin at block 202. At block 202, a processing device of a monitoring node may receive an indication over a network 140 that a virtual machine 124 successfully migrated from a first host (e.g., source host 120A) to a second host (e.g., destination host 120B). The indication may include a virtual machine address of the virtual machine 124 executing on the second host. In an example, the monitoring node may be the source host 120A and the monitoring node may be executing the hypervisor 122A. The processing device of the monitoring node may also receive an instruction to shut down the virtual machine 124 on the first host in response to the virtualization manager 110 receiving the indication from the second host that the virtual machine 124 successfully migrated. Further, instead of shutting down, the hypervisor 122A may remain active after receiving the indication to monitor for the incoming packet having the source address field set to the virtual machine address of the virtual machine on the destination host.

In another example, the monitoring node may be one of the monitoring nodes 135 (e.g., a switch) within the network 140 that is separate from the first node (e.g., source host 120A) and there may be a set of other monitoring nodes 135 that are also switches in the network 140. In this example, the monitoring nodes 135 may receive an instruction to determine whether the incoming packets have a packet type of reverse address resolution protocol (RARP) that are broadcast when a change is made to a topology of the network 140. The monitoring nodes 135 may inspect the incoming packets for the packet type and determine whether the packet type of the incoming packets are RARP.

At block 204, the processing device may, responsive to the indication that the virtual machine 124 successfully migrated from the first host to the second host, start to monitor incoming packets of the monitoring node for an incoming packet having the virtual machine address in a source address field. In one example, the processing device may monitor packets received at a network interface card (NIC) (e.g., connected to the hypervisor 122A via a software bridge on the source host 120A). The virtual machine address may include a media access control (MAC) address tagged with a virtual local area network (VLAN) address.

At block 206, the processing device may, upon determining that none of the incoming packets include the source address field having the virtual machine address, notify a reporting node that the incoming packet was not received. The determination may be made after a threshold period of time. Notifying the reporting node may facilitate performance of one or more actions to reduce downtime of communication with the virtual machine 124 over the network 140. The one or more actions may include identifying the incoming packet being lost as a reason for the downtime, logging the incoming packet being lost as a reason for the downtime in an event log, transmitting an instruction to the second host to send another packet including the source address field having the virtual machine address, transmitting an instruction to the second host to restart the virtual machine 124, transmitting an instruction to the second host to restart the second host, transmitting an instruction to the second host to create a second virtual machine with identical functionality as the virtual machine 124, to stop the virtual machine 124 on the second host, and to start the second virtual machine on the second host; or transmitting an instruction to the first host to create a second virtual machine with identical functionality as the virtual machine 124 and migrate the second virtual machine to the second host, among others.

In another example, the processing device may, upon determining, within the threshold period of time, that at least one incoming packet includes the source address field having the virtual machine address, transmit, to the reporting node, a notification indicating that the incoming packet was received to facilitate a determination by the reporting node that forwarding tables in components (e.g., switches) of the network 140 are updated with at least the new ports at which packets having the virtual machine address arrive (e.g., the forwarding tables updated entries for the virtual machine address with different incoming ports associated with packets received from the virtual machine 124 on the destination host 120B). In an example where the monitoring node 135 is separate from the source host 120A, the monitoring node 135 may determine that the packet type is RARP and the source address field is the virtual machine address prior to determining that the components of the network 140 are updated.

Figure 3:
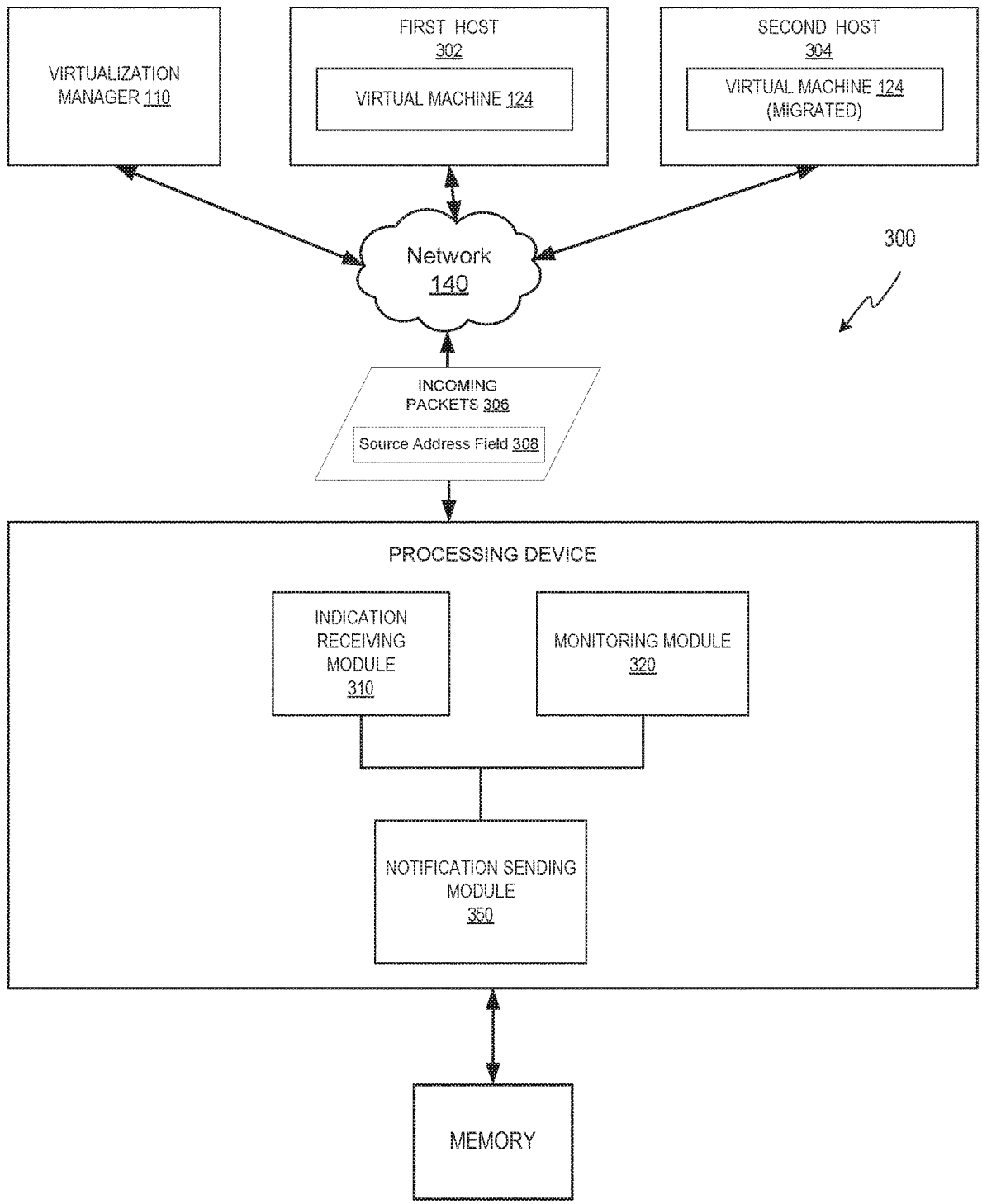
FIG. 3 depicts a block diagram of an example computer system, in accordance with one or more aspects of the present disclosure.

FIG. 3 depicts a block diagram of an example computer system 300, in accordance with one or more aspects of the present disclosure. Computer system 300 may be the same or similar to the source host 120A or the monitoring node 135 and may include one or more processing devices and one or more memory devices. In the example shown, computer system 300 may include indication receiving module 310, monitoring module 320, and notification sending module 330. Also, as depicted, computer system 300 may be communicatively coupled to the virtualization manager 110, first host 302, and second host 304 via the network 140. Although shown as separate from and connected to the first host 302 (e.g., source host 120A), the computer system 300 may be part of the first host 302 in examples where the first host 302 (e.g., source host 120A) is the monitoring node. In the depicted example, the computer system 300 is the monitoring node 135 separate from the first host 302 (e.g., source host 120A).

The indication receiving module 310 may receive an indication over the network 140 that a virtual machine 124 successfully migrated from the first host 302 (e.g., source host 120A) to the second host 304 (e.g., destination host 120B). Successfully migrating may refer to the virtual machine 124 successfully starting on the second host. The indication may be received from the virtualization manager 110 or the destination host 120B. The indication may include a virtual machine address of the virtual machine 124 executing on the second host. In an example, an instruction may be included with the indication that causes the processing device of the source host 120A to shut down the virtual machine 124 on the source host 120A. In another example, the hypervisor 122A may remain active on the source host 120A after receiving the indication that the migration was successful to enable monitoring for incoming packets.

The monitoring module 320 may, responsive to the indication that the virtual machine 124 successfully migrated from the first host to the second host, start to monitor incoming packets 306 of the monitoring node (e.g., source host 120A, monitoring node 135) for an incoming packet 306 that includes a source address field 308 having the virtual machine address. In an example where the monitoring node is separate from the source host 120A, the monitoring module 320 may also inspect incoming packets to identify whether the packets have a certain packet type (e.g., RARP). The monitoring module 320 may monitor for a threshold period of time (e.g., seconds, minutes, hours, etc.).

The notification sending module 330 may, upon determining, after the threshold period of time, that none of the incoming packets 306 include the source address field 308 having the virtual machine address, notify a reporting node that the incoming packet 306 was not received to facilitate performance of one or more actions to reduce downtime of communication with the virtual machine 124 over the network 140. Alternatively, upon determining, within the threshold period of time, that at least one incoming packet 306 includes the source address field 308 having the virtual machine address, the notification sending module 330 may transmit, to the reporting node, a notification indicating that the incoming packet 306 was received to facilitate a determination by the reporting node that forwarding tables in switches of the network 140 are updated with at least the new ports at which packets having the virtual machine address arrive (e.g., the forwarding tables updated entries for the virtual machine address with different incoming ports associated with packets received from the virtual machine 124 on the destination host 120B).

Figure 4:
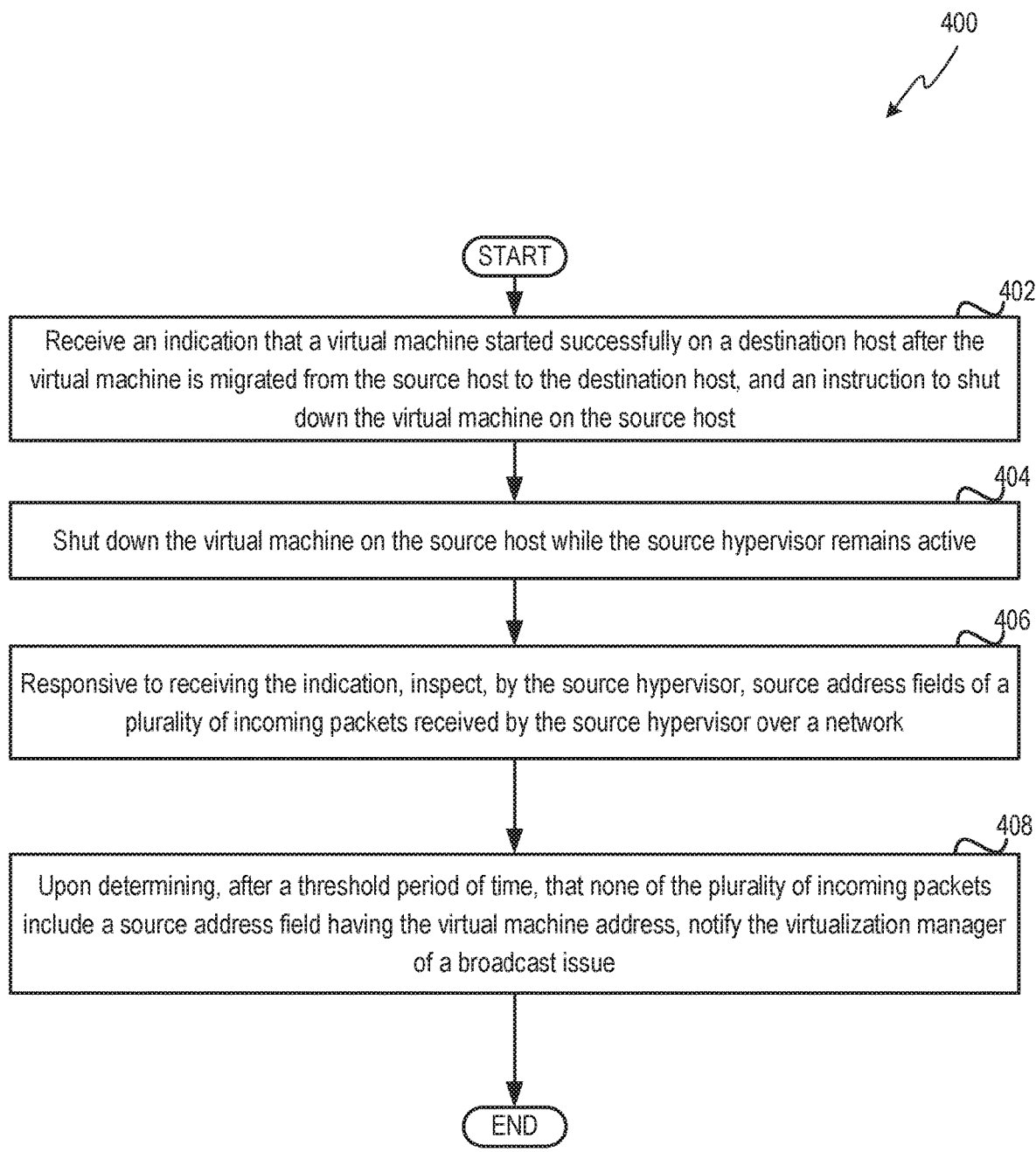
FIG. 4 depicts a flow diagram of another example method for detecting network notification loss for virtual machine migration, in accordance with one or more aspects of the present disclosure.

FIG. 4 depicts a flow diagram of an example method 400 for detecting network notification loss for virtual machine migration, in accordance with one or more aspects of the present disclosure. Method 400 includes operations performed by the source host 120A. Also, method 400 may be performed in the same or a similar manner as described above in regards to method 200. Method 400 may be performed by processing devices of the source host 120A executing the hypervisor 122A and the monitoring component 125.

Method 400 may begin at block 402. At block 402, the processing device may receive, at the source hypervisor 122A from the virtualization manager 110, an indication that the virtual machine 124 started successfully on a destination host 120B after the virtual machine 124 is migrated from the source host 120A to the destination host 120B. The indication may include a virtual machine address of the virtual machine 124 executing on the destination host 120B, and an instruction to shut down the virtual machine 124 on the source host 120A.

At block 404, the processing device may shut down the virtual machine 124 on the source host 120A while the source hypervisor 122A remains active. At block 406, the processing device may, responsive to receiving the indication, inspect source address fields of incoming packets received by the source hypervisor 122A over the network 140. The processing device may inspect for source address fields that are set to the virtual machine address of the virtual machine 124 executing on the destination host 120B.

At block 408, upon determining, after a threshold period of time, that none of the incoming packets include a source address field having the virtual machine address, the processing device may notify the virtualization manager 110 (e.g., reporting node) of a broadcast issue. The virtualization manager 110 may perform one or more actions to reduce downtime in communicating with the virtual machine 124. For example, the one or more actions may include requesting the destination host 120B to resend a notification RARP packet including the virtual machine address in the source address field. Resending the notification RARP packet may cause an update of any components (e.g., switches) in the network 140 that have not been updated yet with the new location of the virtual machine 124 (e.g., the forwarding tables may be updated so entries for the virtual machine address include the different incoming ports associated with packets received from the virtual machine 124 on the destination host 120B). Other actions may include logging the event as a reason for the downtime, notifying a host networking administrator, and/or requesting the destination host 120B to restart the virtual machine 124 and/or the destination host 120B.

Further, upon determining, within the threshold period of time, that at least one incoming packet includes the source address field having the virtual machine address, the processing device may notify the virtualization manager 110 that the incoming packet was received to facilitate a determination by the virtualization manager 110 that forwarding tables in switches of the network 140 are updated with at least the new ports at which packets having the virtual machine address arrive (e.g., the forwarding tables updated entries for the virtual machine address with different incoming ports associated with packets received from the virtual machine 124 on the destination host 120B).

Figure 5:
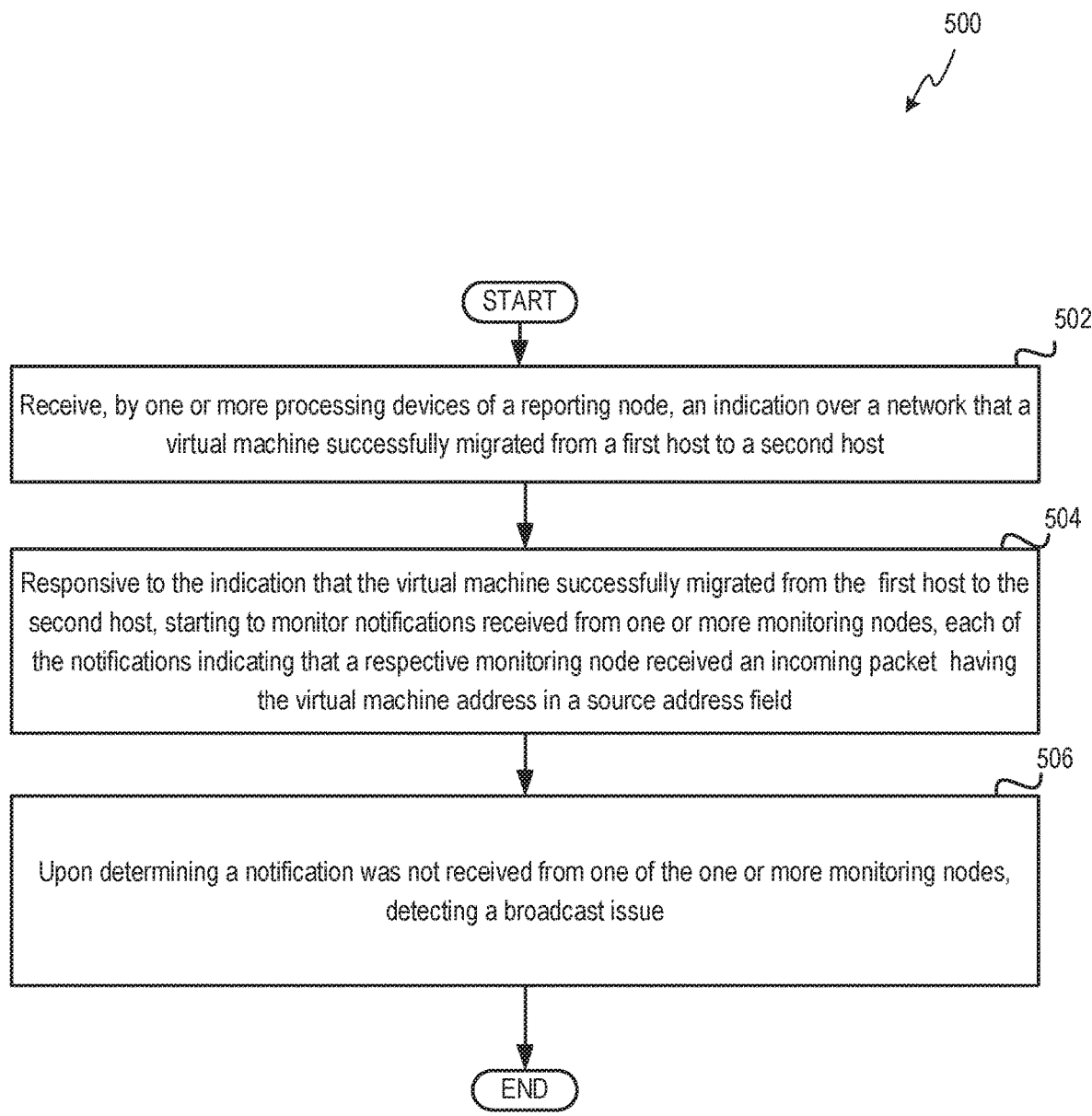
FIG. 5 depicts a flow diagram of an example method for a reporting node detecting network notification loss for virtual machine migration, in accordance with one or more aspects of the present disclosure.

FIG. 5 depicts a flow diagram of an example method 500 for a reporting node detecting network notification loss for virtual machine migration, in accordance with one or more aspects of the present disclosure. Method 500 includes operations performed by the virtualization manager 110 (e.g., reporting node). Also, method 500 may be performed in the same or a similar manner as described above in regards to method 200. Method 500 may be performed by processing devices hosting the virtualization manager 110 executing the reporting component 112.

Method 500 may begin at block 502. At block 502, the processing device may receive an indication over the network 140 that a virtual machine 124 successfully migrated from a first host (e.g., source host 120A) to a second host (e.g., destination host 120B). The indication may include a virtual machine address of the virtual machine 124 executing on the second host.

At block 504, the processing device may, responsive to the indication that the virtual machine 124 successfully migrated from the first host to the second host, start to monitor notifications received from monitoring components 125 of one or more monitoring nodes. Each of the notifications may indicate that a respective monitoring node received an incoming packet having the virtual machine address in a source address field. In an example, the monitoring nodes may be the source host 120A and/or the monitoring nodes 135 (e.g., switches in the network 140) separate from the source host 120A. In an example, the processing device may, in response to receiving the indication, transmit an instruction to the hypervisor 122A to shut down the virtual machine 124 on the first host.

At block 506, upon determining a notification was not received from one of the one or more monitoring nodes, the processing device may detect a broadcast issue (e.g., a notification RARP packet was lost in the network 140). That is, one of the notification RARP packets may not have arrived at a component of the network 140, and thus, that component may not have updated a forwarding table with the new port associated with the packets having the virtual machine address sent by the virtual machine 124 at its new location on the destination host 120B. The processing device may perform an action (e.g., requesting the destination host 120B to resend a notification RARP packet including the virtual machine address in the source address field, logging the event as a reason for the downtime, notifying a host networking administrator, and/or requesting the destination host 120B to restart the virtual machine 124 and/or the destination host 120B, etc.) when a broadcast issue is detected. When notifications are received from a monitoring node, the processing device may determine that the network 140 is updated with at least the new ports at which packets having the virtual machine address arrive (e.g., the forwarding tables in components of the network 140 updated entries for the virtual machine address with a different incoming port associated with packets received from the virtual machine 124 on the destination host 120B).

Figure 6:
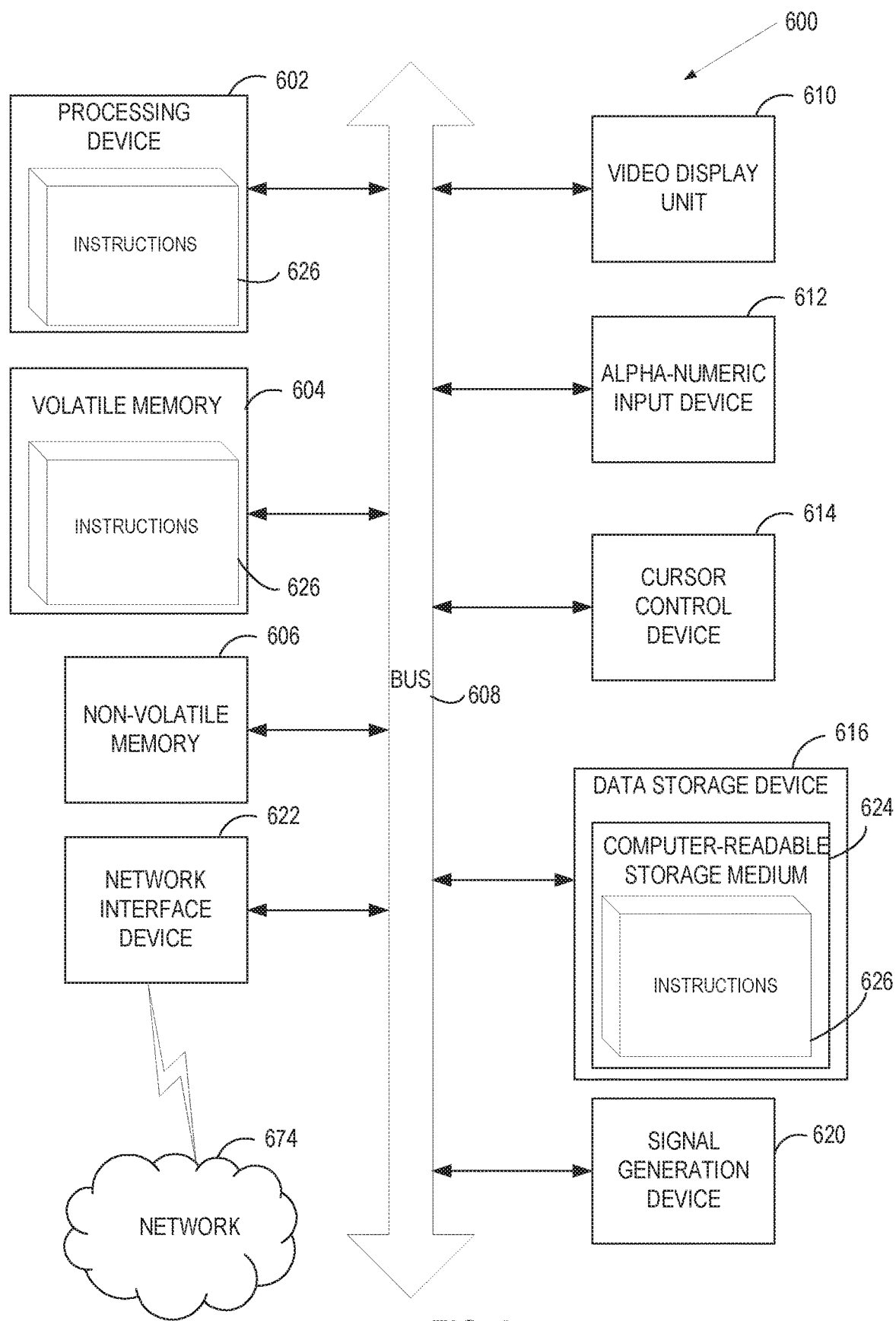
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to a computing device within system architecture 100 of FIG. 1. In one implementation, the computer system 600 may be the source host 120A or the monitoring node 135. In another implementation, the computer system 600 may be hosting the virtualization manager 110. The computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions implementing monitoring component 125 of FIG. 1 for implementing method 200 and method 400 and/or including instructions implementing reporting component 112 of FIG. 1 for implementing method 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 400, and 500, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   receiving, by one or more processing devices of a monitoring node, an indication over a network that a virtual machine successfully migrated from a first host to a second host, the indication comprises a virtual machine address of the virtual machine executing on the second host;
   responsive to the indication that the virtual machine successfully migrated from the first host to the second host, monitoring incoming packets of the monitoring node for an incoming packet having the virtual machine address in a source address field, wherein the monitoring node is separate from the second host; and
   responsive to determining, after a threshold period of time from receiving the indication of successful migration, that none of the incoming packets received during the threshold period of time comprise the source address field having the virtual machine address, notifying a reporting node that the incoming packet was not received.

2. The method of claim 1, wherein notifying the reporting node that the incoming packet was not received facilitates performance of one or more actions to reduce downtime of communications with the virtual machine over the network, the one or more actions comprise one or more of:
   identifying the incoming packet being lost as a reason for the downtime;
   logging the incoming packet being lost in an event log;
   transmitting an instruction to the second host to send another packet including the source address field having the virtual machine address;
   transmitting an instruction to the second host to restart the virtual machine;
   transmitting an instruction to the second host to restart the second host;
   transmitting an instruction to the second host to create a second virtual machine with identical functionality as the virtual machine, to stop the virtual machine on the second host, and to start the second virtual machine on the second host; or
   transmitting an instruction to the first host to create a second virtual machine with identical functionality as the virtual machine and migrate the second virtual machine to the second host.

3. The method of claim 1, comprising, upon determining, within the threshold period of time, that at least one incoming packet includes the source address field having the virtual machine address, transmitting, to the reporting node, a notification indicating that the incoming packet was received to facilitate a determination by the reporting node that forwarding tables in switches of the network are updated with at least ports associated with the virtual machine address.

4. The method of claim 1, wherein a hypervisor executing on the monitoring node remains active after the indication is received.

5. The method of claim 1, wherein the monitoring node is the first host, the monitoring node is executing a hypervisor, and the reporting node is a virtualization manager.

6. The method of claim 5, comprising receiving, from the virtualization manager, an instruction to shut down the virtual machine on the first host in response to the virtualization manager receiving the indication from the second host that the virtual machine successfully migrated.

7. The method of claim 1, wherein the monitoring node is a switch, within the network, separate from the first host, and there are a plurality of other monitoring nodes that are switches in the network.

8. The method of claim 7, comprising:
   receiving, at the monitoring node, an instruction to determine whether the incoming packets have a packet type of reverse address resolution protocol (RARP) that are broadcast when a change is made to a topology of the network;
   inspecting the incoming packets for the packet type; and
   determining whether the packet type of the incoming packets are RARP.

9. The method of claim 1, wherein determining that none of the incoming packets include the source address field having the virtual machine address is performed after a threshold period of time.

10. A system comprising:
    a memory;
    a processing device of a monitoring node operatively coupled to the memory, the processing device to:
        receive an indication over a network that a virtual machine successfully migrated from a first host to a second host, the indication comprises a virtual machine address of the virtual machine executing on the second host;
        responsive to the indication that the virtual machine successfully migrated from the first host to the second host, monitoring incoming packets of the monitoring node for an incoming packet that includes a source address field having the virtual machine address, wherein the monitoring node is separate from the second host; and
        responsive to determining, after a threshold period of time from receiving the indication of successful migration, that none of the incoming packets received during the threshold period of time comprise the source address field having the virtual machine address, notifying a reporting node that the incoming packet was not received to facilitate performance of one or more actions to reduce downtime of communication with the virtual machine over the network.

11. The system of claim 10, wherein the one or more actions comprise one or more of:
identifying the incoming packet being lost as a reason for the downtime;
logging the incoming packet being lost in an event log;
transmitting an instruction to the second host to send another packet including the source address field having the virtual machine address;
transmitting an instruction to the second host to restart the virtual machine;
transmitting an instruction to the second host to restart the second host;
transmitting an instruction to the second host to create a second virtual machine with identical functionality as the virtual machine, to stop the virtual machine on the second host, and to start the second virtual machine on the second host; or
transmitting an instruction to the first host to create a second virtual machine with identical functionality as the virtual machine and migrate the second virtual machine to the second host.

12. The system of claim 10, wherein the processing device is further to, upon determining, within the threshold period of time, that at least one incoming packet includes the source address field having the virtual machine address, transmit, to the reporting node, a notification indicating that the incoming packet was received to facilitate a determination by the reporting node that forwarding tables in switches of the network are updated with at least ports associated with the virtual machine address.

13. The system of claim 10, wherein a hypervisor executing on the monitoring node and previously running the virtual machine that migrated remains active after the indication is received.

14. The system of claim 10, wherein the monitoring node is the first host, the monitoring node is executing a hypervisor, and the reporting node is a virtualization manager.

15. The system of claim 14, wherein the processing device is further to:
receive, from the virtualization manager, an instruction to shut down the virtual machine on the first host in response to the virtualization manager receiving the indication from the second host that the virtual machine successfully migrated.

16. The system of claim 10, wherein the monitoring node is a switch, within the network, separate from the first host, and there are a plurality of other monitoring nodes that are switches in the network.

17. The system of claim 16, wherein the processing device is further to:
receive an instruction to determine whether the incoming packets have a packet type of reverse address resolution protocol (RARP) that are broadcast when a change is made to a topology of the network;
inspect the incoming packets for the packet type; and
determine whether the packet type of the incoming packets are RARP.

18. One or more tangible, non-transitory computer-readable media storing instructions that, when executed, cause one or more processing devices executing a virtualization manager to:
receive, at the virtualization manager, an indication that a virtual machine started successfully on a destination host after the virtual machine is migrated from the source host to the destination host, the indication comprising a virtual machine address of the virtual machine executing on the destination host;
responsive to receiving the indication, monitoring notifications received from one or more monitoring nodes, each of the notifications indicating that a respective monitoring node received an incoming packet having the virtual machine address in a source address field, wherein the monitoring node is separate from the destination host; and
responsive to determining, after a threshold period of time from receiving the indication that the virtual machine started successfully on the destination host, that a notification was not received from one of the one or more monitoring nodes, detecting a broadcast issue.

19. The computer-readable media of claim 18, wherein the one or more processing devices executing virtualization manager are further to, in response to detecting the broadcast issue, request the destination host to resend a notification packet including the virtual machine address in the source address field.

20. The computer-readable media of claim 18, wherein one or more processing devices executing virtualization manager are further to, upon determining notifications are received from the one or more monitoring nodes, determine that forwarding tables in switches of a network are updated with at least ports associated with the virtual machine address.

* * * * *